(12) United States Patent
Kurabayashi

(10) Patent No.: US 10,839,035 B2
(45) Date of Patent: Nov. 17, 2020

(54) PROGRAM, INFORMATION PROCESSING DEVICE, INFORMATION PROCESSING METHOD, AND INFORMATION PROCESSING SYSTEM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 40 days.

(21) Appl. No.: 16/159,044

(22) Filed: Oct. 12, 2018

(65) Prior Publication Data

US 2019/0050489 A1 Feb. 14, 2019

Related U.S. Application Data

(63) Continuation of application No. PCT/JP2017/002372, filed on Jan. 24, 2017.

(30) Foreign Application Priority Data

Apr. 12, 2016 (JP) ................. 2016-079443

(51) Int. Cl.
*G06F 16/954* (2019.01)
*A63F 13/79* (2014.01)
(Continued)

(52) U.S. Cl.
CPC ............ *G06F 16/954* (2019.01); *A63F 13/35* (2014.09); *A63F 13/79* (2014.09); *A63F 13/795* (2014.09);
(Continued)

(58) Field of Classification Search
CPC .................................................. G06F 16/954
(Continued)

(56) References Cited

U.S. PATENT DOCUMENTS

| 8,392,617 B1 | 3/2013 | Weber et al. |
| 2003/0022708 A1 | 1/2003 | Yano et al. |

(Continued)

FOREIGN PATENT DOCUMENTS

| CN | 103049477 A | 4/2013 |
| EP | 1072298 A1 | 1/2001 |

(Continued)

OTHER PUBLICATIONS

Yano et al., "A Card Game System", US Pub 2013027937, 2001 (Year: 2001).*

(Continued)

*Primary Examiner* — Ondrej C Vostal
(74) *Attorney, Agent, or Firm* — Osha Bergman Watanabe & Burton LLP

(57) ABSTRACT

A state monitoring unit monitors whether or not the designation of a specific state is continuing at a user terminal that has performed an access using a first identifier. A second identifier generation unit generates a second identifier when the access using the first identifier by the user terminal is accepted by an accepting unit. An association management unit manages the association between the first identifier corresponding to the specific state and the generated second identifier during a period in which the designation of the specific state is continuing or during a prescribed period after the end of said period at the user terminal, and after that, when it is determined that the designation of the specific state has ended or the prescribed period has elapsed after the end at the user terminal, the association management unit discards the association between the first identifier and the second identifier.

6 Claims, 12 Drawing Sheets

(51) Int. Cl.
  *A63F 13/35* (2014.01)
  *A63F 13/795* (2014.01)
  *G06F 16/955* (2019.01)
  *G06F 16/9538* (2019.01)
  *H04L 12/26* (2006.01)
  *H04L 29/08* (2006.01)

(52) U.S. Cl.
  CPC ........ *G06F 16/955* (2019.01); *G06F 16/9538* (2019.01); *H04L 43/08* (2013.01); *H04L 67/02* (2013.01); *H04L 67/303* (2013.01); *H04L 67/142* (2013.01); *H04L 67/148* (2013.01)

(58) Field of Classification Search
  USPC ........................................................ 709/248
  See application file for complete search history.

(56) References Cited

U.S. PATENT DOCUMENTS

| | | | | |
|---|---|---|---|---|
| 2008/0128505 | A1* | 6/2008 | Challa | G06K 7/0008 235/462.13 |
| 2008/0147831 | A1* | 6/2008 | Redjaian | G06F 21/57 709/222 |
| 2008/0305856 | A1* | 12/2008 | Walker | G07F 17/32 463/25 |
| 2008/0307044 | A1 | 12/2008 | Musson | |
| 2009/0023492 | A1* | 1/2009 | Erfanian | G07F 17/32 463/23 |
| 2009/0054124 | A1* | 2/2009 | Robbers | A63F 1/00 463/9 |
| 2010/0146115 | A1* | 6/2010 | Bezos | H04W 4/21 709/225 |
| 2011/0053673 | A1* | 3/2011 | Hardy | G07F 17/3239 463/17 |
| 2012/0320408 | A1* | 12/2012 | Evevsky | G06F 3/124 358/1.15 |
| 2013/0060851 | A1* | 3/2013 | Davis | G06Q 20/383 709/204 |
| 2013/0061333 | A1* | 3/2013 | Davis | H04L 63/0861 726/28 |
| 2013/0097192 | A1* | 4/2013 | Li | G06F 16/40 707/755 |
| 2013/0262304 | A1* | 10/2013 | Vesely | G06F 3/048 705/43 |
| 2014/0040070 | A1* | 2/2014 | Pereymer | G06F 40/14 705/26.8 |
| 2014/0279474 | A1* | 9/2014 | Evans | G06Q 20/3572 705/41 |
| 2015/0295757 | A1* | 10/2015 | Debate | G06F 16/90335 709/220 |
| 2016/0042158 | A1* | 2/2016 | Arana | G06F 21/105 726/27 |
| 2016/0071356 | A1* | 3/2016 | Rehill | A63F 13/80 463/13 |
| 2016/0103565 | A1* | 4/2016 | Greenberg | G06F 3/0488 715/833 |
| 2016/0226997 | A1* | 8/2016 | Zeng | H04W 4/80 |

FOREIGN PATENT DOCUMENTS

| | | |
|---|---|---|
| JP | 2001-096064 A | 4/2001 |
| JP | 2003-010535 A | 1/2003 |
| JP | 2012-174205 A | 9/2012 |
| JP | 2013-120603 A | 6/2013 |
| KR | 10-2011-0130866 A | 12/2011 |

OTHER PUBLICATIONS

International Search Report issued in Application No. PCT/JP2017/002372, dated Feb. 28, 2017 (1 page).
Written Opinion issued in International Application No. PCT/JP2017/002372, dated Feb. 28, 2017 (3 pages).
Notification of Reasons for Refusal issued in Japanese Application No. 2018-247761, dated Mar. 17, 2020 (2 pages).

* cited by examiner

FIG. 7

Code Input [          ] Load

Generate Deck!

| 454 | 7429 | 5405 | 2246 | 4026 | 533 | 5008 | 8709 | 8319 | 4622 | 199 | 503 | 5786 | 4304 | 5179 | 6204 | 700 | 8028 | 9865 | 282 |
| 7545 | 3389 | 3645 | 2386 | 9424 | 5498 | 6160 | 9114 | 7654 | 2210 | 530 | 2263 | 6317 | 4201 | 1758 | 4897 | 3893 | 8125 | 5541 |
| 8852 |

76.1q5.1KT Z6.-
w.8L.1EG285 21._18E.37.7t.1QQ.13G.1Gx.1Wy.Ay.1zS.2Q9.4Q.1rv.qz.uz.bI.2JG.1Lw.1WG.2EQ.1tc.YY.8I.ZN.1Yj.11fR
U.1CX.yr.1-z.1Mb.2AK

Share in SNS

Code : [ tr0n ]

Valid Until:

( RENEW )

FIG. 10
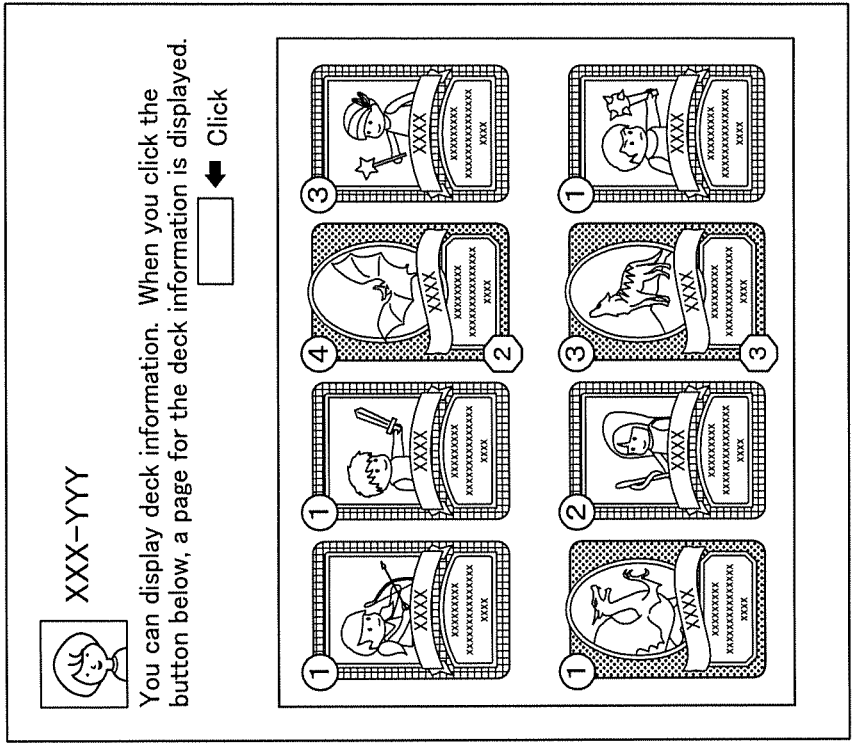
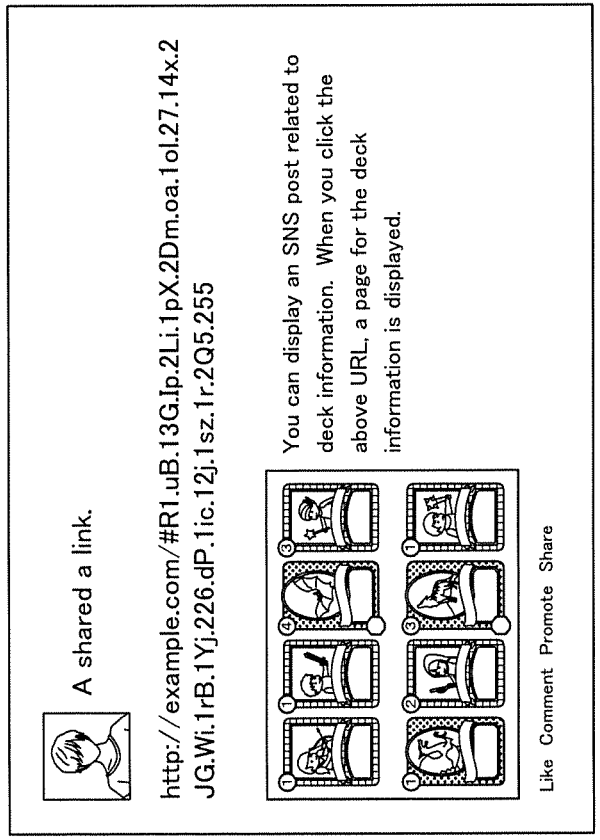

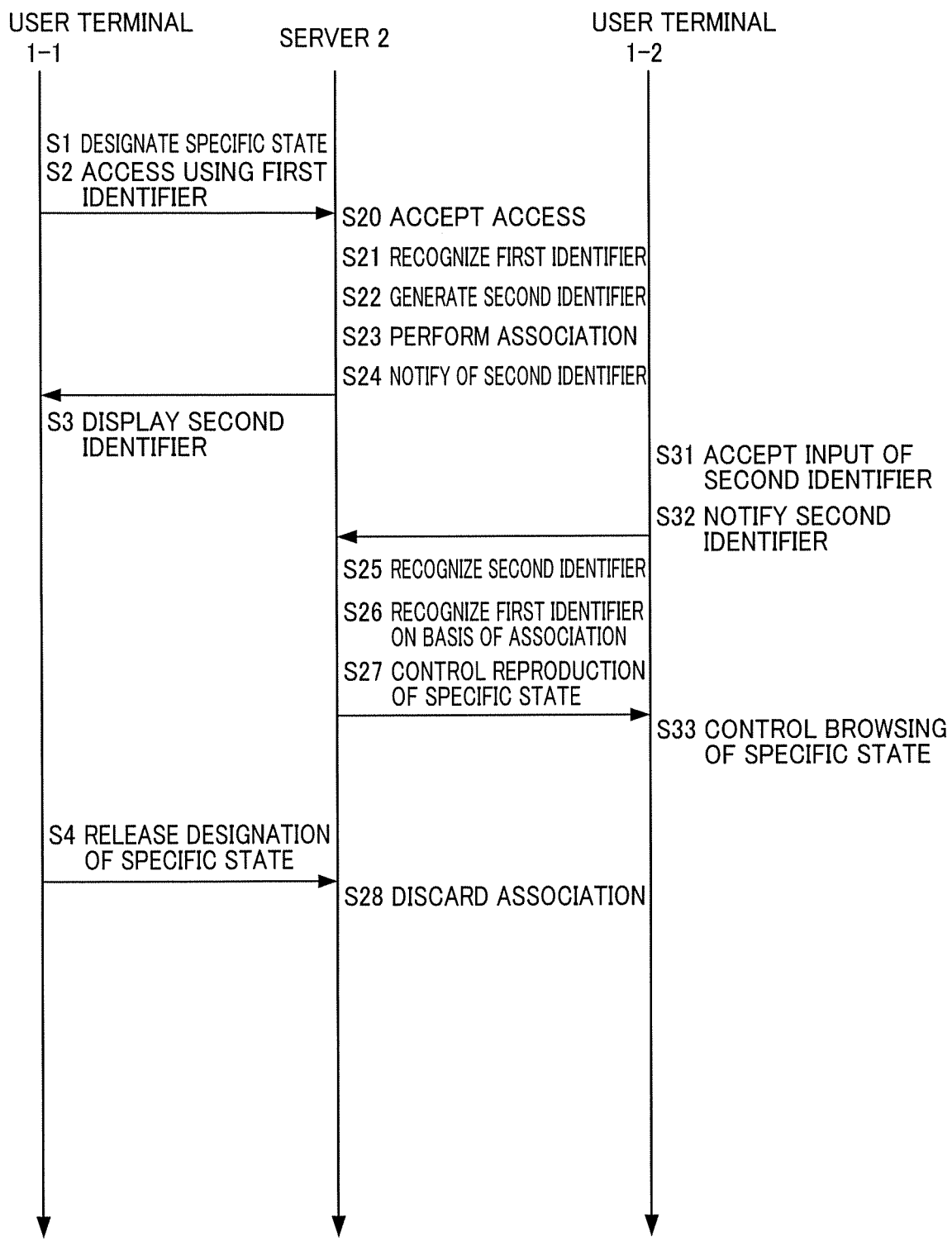

PROGRAM, INFORMATION PROCESSING DEVICE, INFORMATION PROCESSING METHOD, AND INFORMATION PROCESSING SYSTEM

TECHNICAL FIELD

The present invention relates to a program, an information processing device, an information processing method, and an information processing system.

BACKGROUND ART

There already exists a technology for synchronizing a terminal A and another terminal B via a communication network in a system including a plurality of terminals communicatively connected with a server, such that a specific state (a web page displayed in a web browser) designated at the terminal A at a certain timing can be shared with the terminal B (e.g., see Patent Literature 1).

However, in order to realize this technology with a certain level of information security, one of the terminal A and the terminal B needs to execute authentication processing with respect to the other terminal. The server needs to manage user information corresponding to individual terminals in order to realize such authentication processing. However, close attention needs to be paid to the management of the user information, and there are cases where the user information cannot be stored on the server or the terminal for some reason.

Then, although it is required that the specific state be shared not via a communication connection, in order to meet this requirement, much labor is needed for sharing when the amount of information is huge. Thus, it is desired that the amount of shared information be small enough for users to easily remember or communicate.

As an example of a technology for shortening information the amount of which is too large for humans to remember to a certain amount, there is a technology in which a URL on the web is shortened to a shorter string in advance, the original long URL is associated with a short URL generated when the URL is registered, and, when access is made to the short URL, the access is transferred to the original long URL (e.g, see Patent Literature 2).

CITATION LIST

Patent Literature

PTL 1
  Japanese Unexamined Patent Application, Publication No. 2013-120603
PTL 2
  Japanese Unexamined Patent Application, Publication No. 2012-174205

DISCLOSURE OF THE INVENTION

Problems to be Solved by the Invention

However, even with the above-described technology for shortening URLs, it is not possible to significantly shorten the number of characters in URLs, which are identifiers constituted of only lowercase characters and numbers, and thus, URLs are not suitable for verbal communication.

In addition, the method for shortening URLs is not scalable because a combination of identifiers is consumed each time new data is registered.

In addition, URLs indicate the locations of information on the web, as represented by the name thereof, i.e., Uniform Resource Locators, and information provided at these locations (corresponding to the above-described specific states) can be arbitrarily designated by a web page creator. Specifically, although information indicating the content of a company top page identified by a certain URL is arbitrarily designated, existing URLs cannot guarantee the uniqueness of this information, and thus are not suitable, as they are, for the communication of arbitrarily designated information. Therefore, the shortened-URL technology, which is a service for shortening these URLs, is also not suitable for the communication of this information.

The present invention has been made in view of the situation described above, and it is an object thereof to establish a technology for immediately sharing a specific state indicated at a device between users and between devices without requiring any special user authentication processing.

Means for Solving the Problems

In order to achieve the above object, an information processing program according to an aspect of the present invention causes a server to execute control processing, the server communicating with a plurality of terminals on which it is possible to display a reproducible specific state arbitrarily designated by a user on the basis of the designation, the control processing including:

an accepting step of accepting an access using a first identifier uniquely associated with the specific state from a first terminal among the plurality of terminals;

a monitoring step of monitoring whether or not the designation of the specific state is continuing at the first terminal that has performed the access using the first identifier;

a generation step of generating a second identifier when the access performed by the first terminal using the first identifier is accepted;

a display control step of executing control for displaying the generated second identifier on the first terminal;

a management step of managing the association between the first identifier corresponding to the specific state and the generated second identifier during a period in which the designation of the specific state is continuing or during a prescribed period after the end of said period at the first terminal, and after that, when it is determined that the designation of the specific state has ended or the prescribed period has elapsed after the end at the first terminal, discarding the association between the first identifier and the second identifier; and a state reproduction step of executing, in the case where the second identifier is notified from a second terminal among the plurality of terminals while the management is continuing in the management step, control for making it possible to reproduce the specific state corresponding to the first identifier associated with the second identifier at the second terminal.

An information processing device, an information processing method, and an information processing system according to an aspect of the present invention are an information processing device, an information processing method, and an information processing system corresponding to the above-described information processing program according to an aspect of the present invention.

Effects of the Invention

The present invention makes it possible to establish a technology for immediately sharing a specific state indicated at a device between users and between devices without requiring any special user authentication processing.

BRIEF DESCRIPTION OF THE DRAWINGS

FIG. 7 is an illustration showing an example implementation of the display of a first identifier and a second identifier displayed at a user terminal 1.

FIG. 10 is an illustration showing an example of sharing deck information on an SNS.

FIG. 11 is an arrow chart showing the flow of game data sharing processing executed by the user terminal 1-1, the user terminal 1-2, and the server 2.

PREFERRED MODE FOR CARRYING OUT THE INVENTION

An embodiment of the present invention will be described below with reference to the drawings, by using, as an example, a network game that is played by connecting a server and a terminal via network communication.

Figure 1:
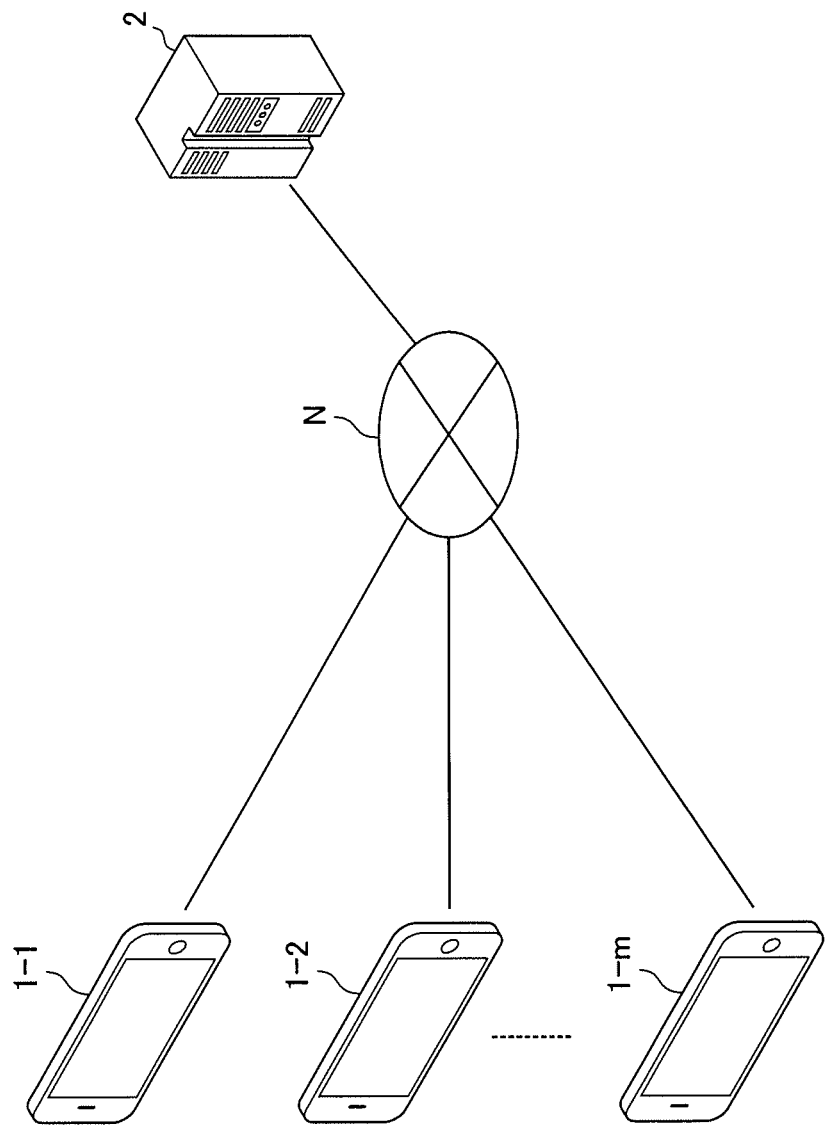
FIG. 1 is a diagram showing the configuration of an information processing system according to an embodiment of the present invention.

FIG. 1 shows the configuration of an information processing system according to an embodiment of the present invention.

The information processing system shown in FIG. 1 is a system including player terminals 1-1 to 1-*m* individually used by m users (m is an arbitrary integer greater than or equal to 1) and also including a server 2. The individual user terminals 1-1 to 1-*m* and the server 2 are connected to each other via a prescribed network N, such as the Internet.

The server 2 provides the individual user terminals 1-1 to 1-*m* with a game execution environment to provide various services relating to a game that is executed at the individual user terminals 1-1 to 1-*m*.

Each of the user terminals 1-1 to 1-*m* is implemented by a smartphone or the like operated by each user and executes various kinds of processing, such as executing a game.

Hereinafter, in the case where there is no need for distinction among the individual user terminals 1-1 to 1-*m*, these will be referred to collectively as "user terminals 1".

Figure 2:
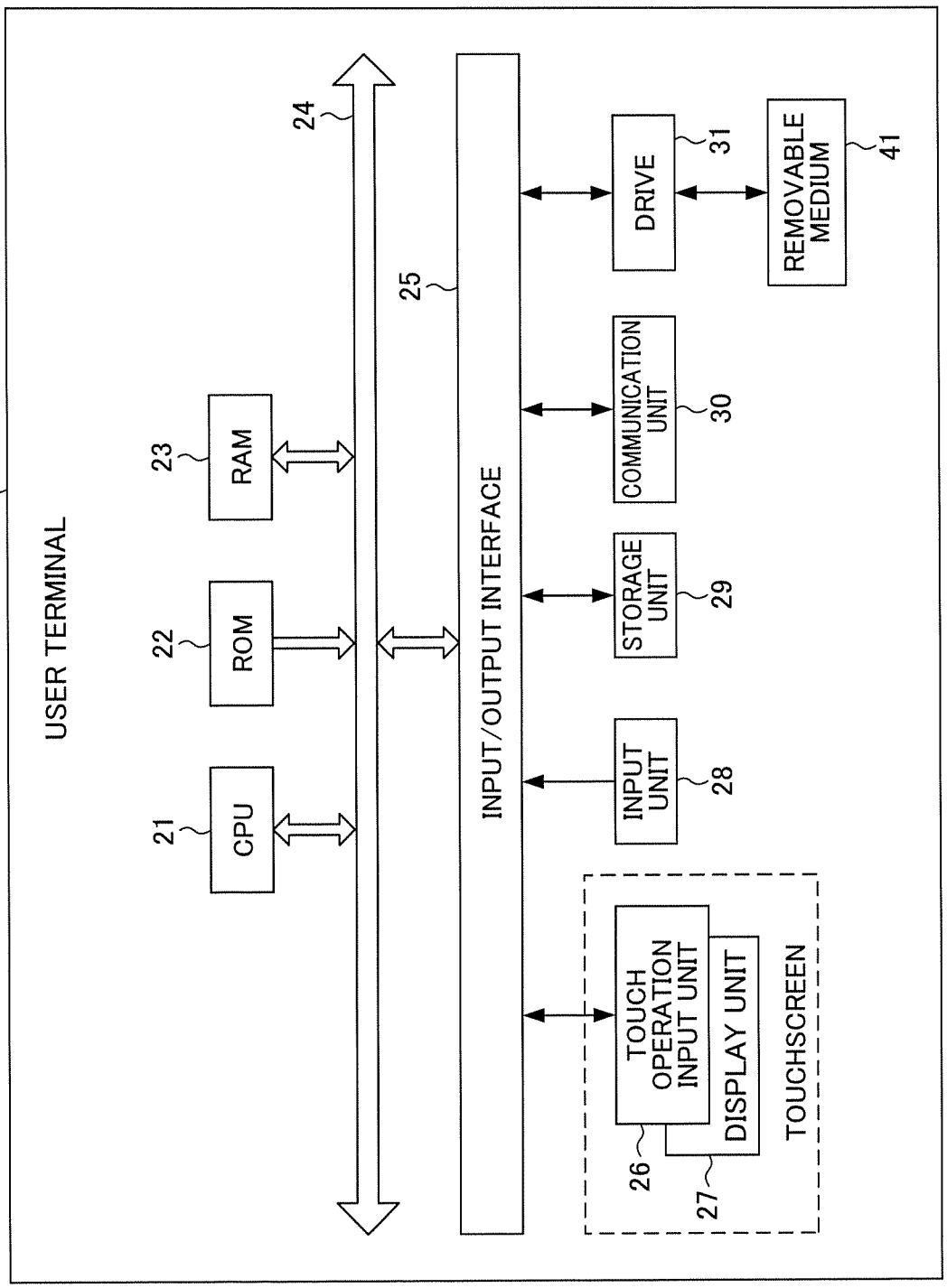
FIG. 2 is a block diagram showing, in the information processing system in FIG. 1, the hardware configuration of a user terminal 1.

FIG. 2 is a block diagram showing the hardware configuration of a user terminal 1 in the information processing system in FIG. 1.

As described above, the user terminal 1 is implemented by a smartphone or the like.

The user terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, and a drive 31.

The CPU 21 executes various kinds of processing according to programs recorded in the ROM 22 or programs loaded from the storage unit 29 into the RAM 23.

The RAM 23 also stores, as appropriate, data, etc. that are needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, and the drive 31 are connected to the input/output interface 25.

The touch-operation input unit 26 is constituted of, for example, capacitive or resistive (pressure-sensitive) position input sensors that are laid over the display surface of the display unit 27, which detect the coordinates of a position at which a touch operation is performed.

The touch operation here refers to bringing an object into contact with the touch-operation input unit 26. What is brought into contact with the touch-operation input unit 26 is, for example, a user's finger or a stylus.

The display unit 27 is implemented by a display, such as a liquid crystal display, and displays various kinds of images, such as images related to the game.

As described above, in this embodiment, a touchscreen is constituted of the touch-operation input unit 26 and the display unit 27.

The input unit 28 is constituted of various kinds of hardware buttons, etc. and allows input of various kinds of information in accordance with instruction operations performed by the user.

The storage unit 29 is implemented by a DRAM (Dynamic Random Access Memory) or the like and stores various kinds of data.

The communication unit 30 controls communications carried out with other devices (the server 2 and the other user terminals 1 in the example in FIG. 1) via the network N, including the Internet.

The drive 31 is provided as needed. A removable medium 41 implemented by a magnetic disk, an optical disk, a magneto-optical disk, a semiconductor memory, or the like is loaded in the drive 31 as appropriate. A program read from the removable medium 41 by the drive 31 is installed in the storage unit 29 as needed. The removable medium 41 can also store various kinds of data stored in the storage unit 29, similarly to the storage unit 29.

Figure 3:
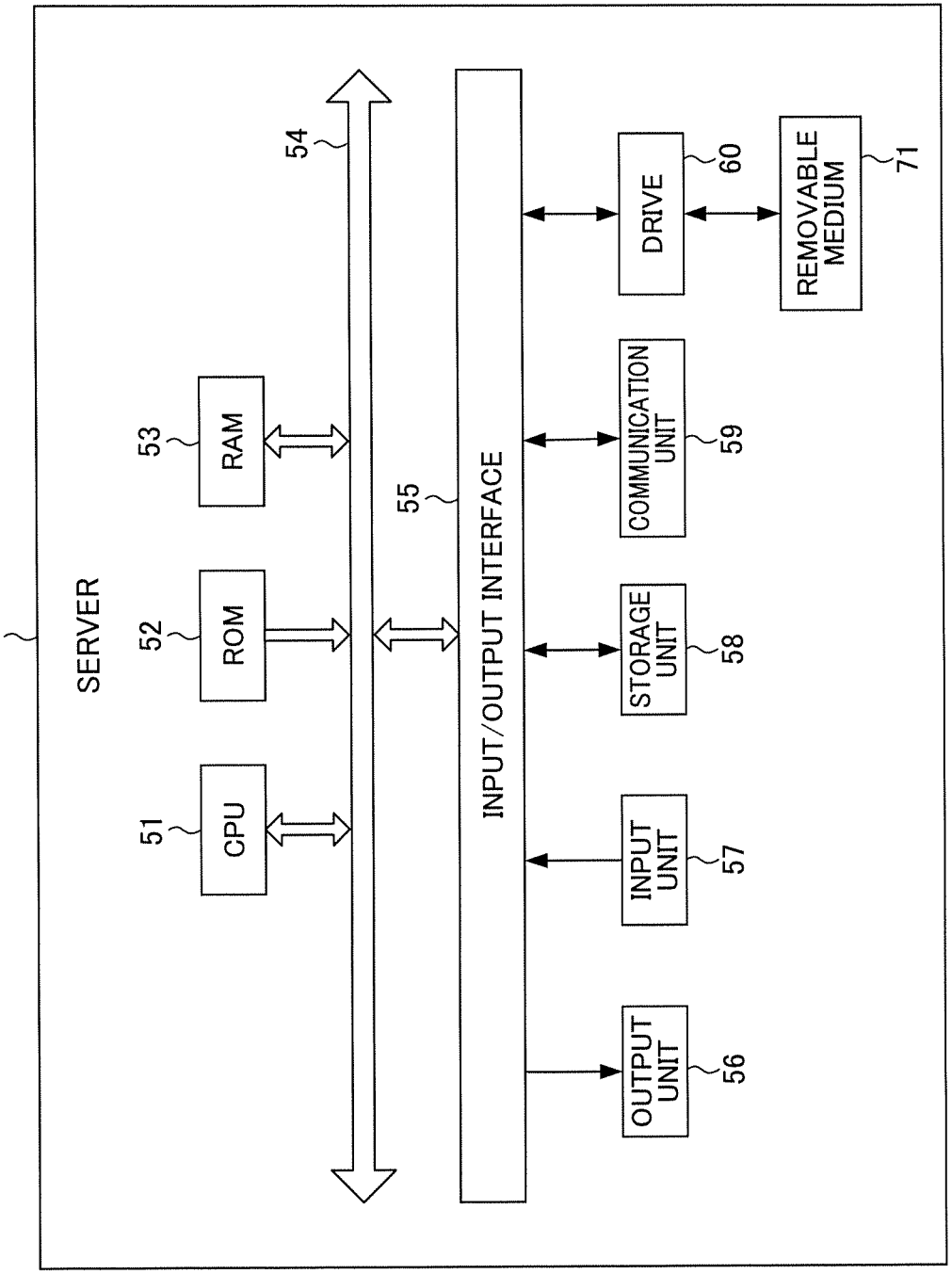
FIG. 3 is a block diagram showing, in the information processing system in FIG. 1, the hardware configuration of a server 2 according to an embodiment of an information processing device according to the present invention.

FIG. 3 is a block diagram showing, in the information processing system in FIG. 1, the hardware configuration of the server 2 according to an embodiment of an information processing device according to the present invention.

The server 2 includes a CPU 51, a ROM 52, a RAM 53, a bus 54, an input/output interface 55, an output unit 56, an input unit 57, a storage unit 58, a communication unit 59, and a drive 60.

Since the configuration of the server 2 is basically the same as that of the user terminal 1 with the touchscreen thereof removed, a description thereof will be omitted here.

Through cooperation between the above-described various kinds of hardware and various kinds of software in the user terminal 1 in FIG. 2 and the server 2 in FIG. 3, it becomes possible to execute a game on the user terminal 1.

Specifically, the information processing system in this embodiment can execute various kinds of control in relation to a game in which a plurality of users can participate. In particular, the information processing system can execute the following control as control for immediately sharing data related to the game between users and between different kinds of devices without requiring any special user authentication (hereinafter referred to as "data sharing control").

That is, the information processing system according to this embodiment executes control directed to games in which users designate various specific states, such as card games or miniscape games. The data here means data indicating a specific state in a game.

The specific state in a game refers to a reproducible state arbitrarily designated by a user. For example, in the case of a card game, an example of the specific state is a card deck (hereinafter referred to simply as a deck) constituted of a combination of a plurality of kinds of specific cards designated by the user.

The information processing system according to this embodiment makes it possible to easily share the data designated by the user among different kinds of devices (different kinds of user terminals 1) by means of various media.

In order to make it possible to share the data designated by the user, i.e., the data indicating the specific state of the game, a code is used. In addition, in order to make it possible to easily share the data among different kinds of devices by means of various media, it is preferable to use a shortened code obtained by converting a code so as to be short enough for the user to easily remember.

However, the information processing system according to this embodiment does not assign the shortened code directly to the data arbitrarily designated by the user, the number of kinds of which can be huge (i.e., specific states in a game, the number of kinds of which can be huge), but assigns the shortened code to a "connection" that allows an access for designating the data. This "connection" is an access performed by the user terminal 1 (user) with respect to the server 2 at an arbitrary timing, and is not persistent. That is, the number of user terminals 1 while accessing the server 2 via game application software (or during a period from the termination of the access to a prescribed point in time) is at most the same as the number of registered users, and thus, it is considered that this number is limited compared with the number of kinds of data.

In the information processing system according to this embodiment, it is possible to adopt, as the shortened code, a shortened code that is extremely short, e.g., about four characters long. Specifically, for example, in the case of complex data (specific states in a game) having combinations of more than or equal to 101000, it is possible to uniquely identify the data by using a shortened code that is extremely short, i.e., about four characters long.

That is, this embodiment realizes, separately from an identifier (hereinafter referred to as a "first identifier") used to distribute data by means of various media (paper, SNS (Social Networking Service), wireless communication, etc.), an identifier (hereinafter referred to as a "second identifier") used to load the data into a game application software ("application software" will be hereinafter referred to as an "application" or an "app", the shortened form thereof, as appropriate), by using the shortened code that is extremely short, i.e., about four characters long.

In addition, this embodiment adopts a two-step identifier management method in which an association between the first identifier and the second identifier is managed dynamically. This makes it possible to realize data distribution or input while providing information representation ability and ease of input.

Specifically, for example, in the information processing system according to this embodiment, a unique first identifier is identified with respect to data indicating a reproducible specific state arbitrarily designated by a user. This first identifier has content-dependent uniqueness. Thus, even in the case of data designated by a different user, the same first identifier is always identified with respect to the data indicating the same specific state in the same game application.

In other words, with respect to different specific states in a game, different first identifiers are always identified.

A first identifier is information identified by a first identifier identification unit, which is not shown. The first identifier identification unit identifies the first identifier as information uniquely indicating a specific state reproducible in a prescribed application, by means of a specific algorithm designed to be applied to a prescribed application (in this embodiment, a game application). Since the timing at which the first identifier is identified may be an arbitrary timing, the first identifier identification unit may additionally have a function for identifying and managing the first identifier. In addition, the location of the first identifier identification unit is not particularly limited. That is, the first identifier identification unit may be provided in the server 2, or may be provided in another apparatus cooperating with the server 2.

Here, this embodiment does not use a first identifier for distribution in the original form, but uses the first identifier encoded in a URL string, i.e., a URL including the first identifier as a parameter.

That is, in this embodiment, user's browsing of data (a specific state in a game identified by the first identifier) located at the URL by using a web browser, etc. indicates that the specific state is designated. In addition, a period during which an access to the URL continues and a connection is established corresponds to a period during which the designation of the specific state continues.

Note that using a URL as the first identifier is just an example, and there is no limitation to this example. Another example will be described later.

As described above, in order for a user to designate a specific state and browse data indicating the specific state, the user needs to operate a user terminal 1 so as to access a URL including a first identifier corresponding to the specific state as a parameter, and browse data located at the URL by using a prescribed web browser, etc. A temporary identifier that is only valid during a period during which the designation of the specific state continues, i.e., a period during which a connection to the URL is established, in other words, a period during which the data is browsed, is generated as a second identifier.

The second identifier is generated as a string that is, for example, about four characters long, and presented to the user after being associated with the first identifier. This makes it possible for a user who has been presented the second identifier or another user who has been communicated the second identifier verbally, etc. from said user to obtain corresponding data, i.e., data indicating the specific state being continuously designated, simply by performing an operation for inputting a string that is about four characters long in a game being executed, etc.

As described above, the number of kinds of data indicating specific states in a game becomes huge because of the huge number of combinations of individual components of the data (e.g., cards in a card game). First identifiers, which have content-dependent uniqueness, are assigned to such a huge number of kinds of data.

That is, a first identifier does not include information related to a specific user (such as an ID or personal information for identifying the user), and depends only on the content of the data. Thus, any user is allowed to access the same URL if the user designates the same specific state in a game.

Specifically, for example, in the case of a card game, the specific state in the game is a deck, and the same deck configuration of different users is always associated with the same first identifier. Thus, in order to share data in a game according to this embodiment, there is no need to use information for identifying a user, or there is no need to perform user authentication. Therefore, it is possible to share the data without accessing a game server (the server 2 in this embodiment) that manages user information. In view of what has been described above, the information processing system according to this embodiment also makes it possible to easily realize the data sharing by using a server other than the game server, for example, a server provided by a third party that is not an administrator of the game.

Meanwhile, a second identifier is assigned to an access (connection) using a first identifier, not to a specific state in a game. Here, among a plurality of user terminals 1, the number of user terminals 1 that perform an access simultaneously is overwhelmingly smaller than the number of kinds of specific states in a game. Thus, the second identifier can be realized with a string that is about four characters long, as described above.

Then, as a result of managing the second identifier and the first identifier in association with each other, it is possible to represent data indicating specific states in a game, which have a huge number of combinations, by using extremely short codes (second identifiers).

This makes it possible to realize data distribution or input while providing information representation ability and ease of input. In addition, user authentication is not required when sharing the data indicating specific states in a game.

To further explain this by using a card game as an example, among data designated by a user in the card game, in particular, data called "a deck" is data indicating a combination of a plurality of cards used in the game, and is data indicating a specific state in the game.

By adopting the method according to this embodiment, in which a first identifier and a second identifier are associated with each other, it becomes possible to transmit and receive the same deck very easily between different users or between different devices used by the same user.

Specifically, for example, it becomes possible to realize temporary sharing processing between devices, in which the same user edits a deck registered on a smartphone (a user terminal 2) on a personal computer (another user terminal 2), etc., and immediately reflects the result on the smartphone without executing processing such as login. Alternatively, it also becomes possible to realize temporary sharing processing between users, in which a user immediately communicates his/her deck with another user (friend) being present in the same place.

Specifically, for example, it is assumed that a card game in which 40 cards, including duplicates, are selected from 4,000 kinds of cards so as to configure a deck is adopted.

In this kind of card game, the number of card combinations is huge, and the possible number of kinds of decks (states in the game) each constituted of 40 cards is huge, i.e., $4000^{40}$ (=$1.2 \times 10^{144}$).

Thus, when it is assumed that identifiers for unique identification are simply assigned to the huge number of kinds of decks, 144-character identifiers are needed when integers are used, and 80-character identifiers are needed even when these identifiers are represented as combinations of 64 characters including numbers, alphabetic characters, and some symbols. This kind of identifier represented as a long string is difficult to remember on the spot, and cannot be used, for example, for verbal communication between users, or in the case where the deck is announced to an audience at an event site.

Meanwhile, the 80-character identifier needs to be used to uniquely identify a deck designated by a user. Thus, the 80-character identifier is adopted as a first identifier to uniquely identify the deck designated by the user.

In addition, a second identifier that is about four characters long, which is associated with the first identifier, is used so that the user can easily remember and use it, for example, for verbal communication between users, or in the case where the deck is announced to an audience at an event site.

This second identifier is only valid while the user is continuing to browse the deck associated with the first identifier by performing an access using the first identifier. That is, the second identifier is assigned to an access (browsing of the deck associated with the first identifier) by the user.

Here, as described above, the number of users playing a game simultaneously is considerably smaller than the number of specific states in the game. Thus, it is possible to adopt a very short identifier, i.e., an identifier that is about four characters long, as the second identifier.

In addition, there is the case where a user wishes to temporarily share a deck between devices, wherein the user edits a deck registered on a smartphone (a first user terminal 1) on a personal computer (a second user terminal 1), and the result is immediately reflected on the smartphone without performing processing such as login.

Such sharing can also be easily realized by dynamically associating the first identifier and the second identifier with each other. That is, it is possible to realize scalability such that there are always a sufficient number of identifiers even when a user has performed registration processing thousands of times for communication between devices.

Such game data sharing will further be described below with reference to FIG. 4.

Figure 4:
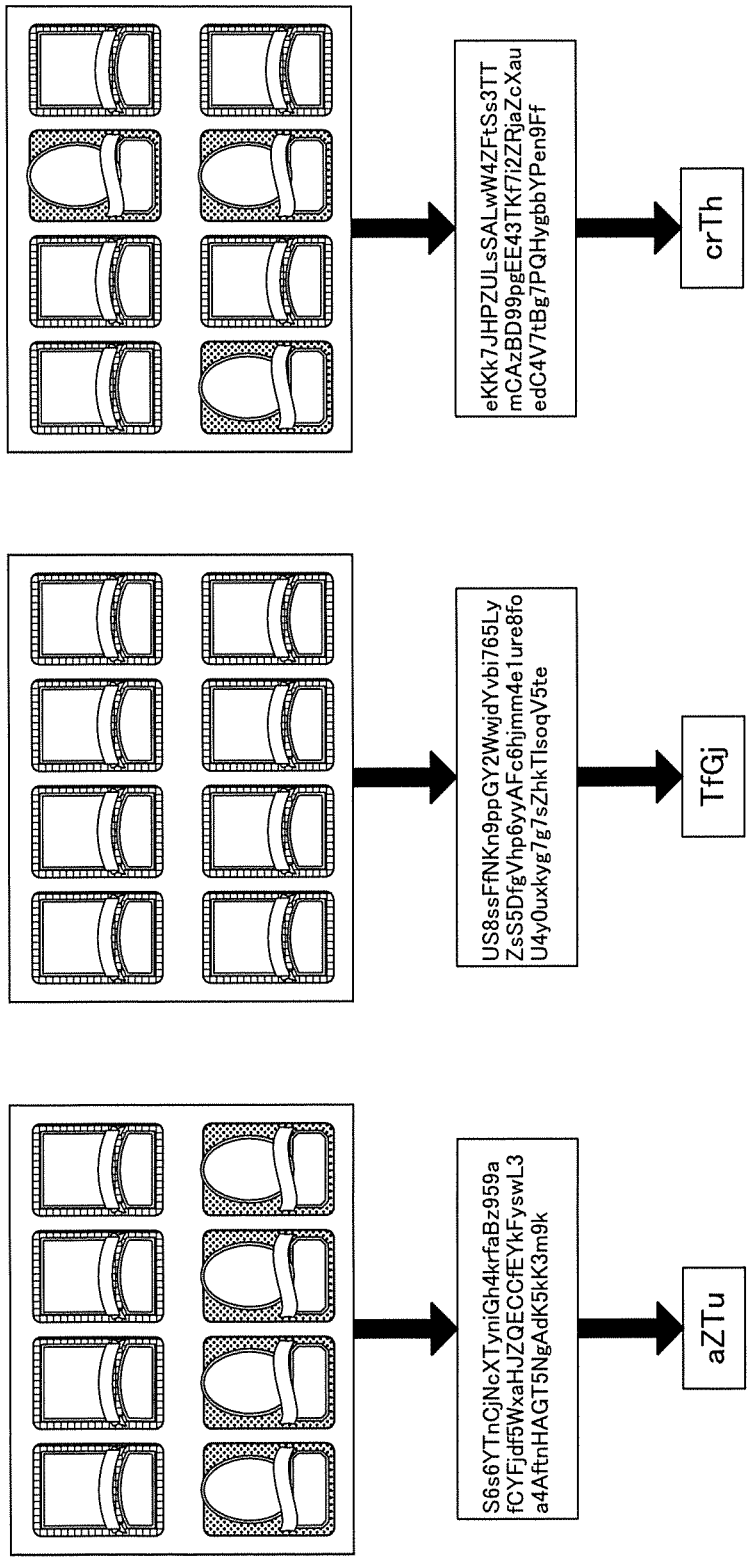
FIG. 4 is an illustration showing an overview of a method for sharing deck information between users or different kinds of devices by using an identifier that can be communicated verbally.

FIG. 4 is an illustration showing an overview of a method for sharing deck information between users or different kinds of devices by using an identifier that can be communicated verbally.

The information processing system according to this embodiment performs scalable two-step identifier management in which a first identifier, which makes it possible to permanently identify a specific state designated by a user in various situations in a game, and a second identifier, which makes it possible to temporarily identify an access to the server 2 using the first identifier (continuous designation of the specific state), are dynamically associated with each other. This makes it possible, from the viewpoint of the user, to identify, from among various specific states having a huge number of combinations in the game, a specific state designated by the user by merely using the second identifier, which has an extremely small amount of information, i.e., about four characters, and to transfer data that makes it possible to reproduce the specific state between different kinds of devices or users.

Here, the scalable two-step identifier management indicates that, even in the case where the number of specific states in the game becomes huge, the number of characters in the second identifier input by the user does not increase, and even in the case where the number of iterations of data registration processing for transferring data to another user or device becomes huge, the number of characters in the second identifier input by the user does not increase.

The upper part of FIG. 4 shows specific states in a game. Specifically, in the example in FIG. 4, card decks used in a card game are shown.

The center part of FIG. 4 shows first identifiers, which make it possible to permanently identify the specific states in the game. As shown in FIG. 4, the specific states in the game change in order of left to right in the figure, and the first identifiers are assigned to the different individual specific states in the game.

The lower part of FIG. 4 shows second identifiers corresponding to the first identifiers shown in the center part of the figure. Every time an access using a first identifier (in this embodiment, an access to a URL including the first identifier) is performed, a second identifier, which is only valid during a session period (a period during which a specific state corresponding to the first identifier is designated by a user) is generated.

First identifiers and second identifiers will further be described below.

First identifiers are permanent unique identifiers that make it possible to identify a huge number of kinds of specific states in a game. First identifiers make it possible to always identify data indicating specific states in a specific game application uniquely and permanently, and thus are suitable for distribution of data via paper media such as magazines, or network services such as SNSs. In addition, by representing first identifiers as URLs, it is possible to distribute the first identifiers by directly using existing mechanisms for distributing URLs.

Second identifiers are each represented by a short string that is about four characters long, and are suitable for being used to immediately transfer data from a prescribed user terminal 1 to another user terminal 1 executing a game. In this embodiment, a second identifier is dynamically generated every time an access using a first identifier is performed.

That is, when a user terminal 1 performs an access using a first identifier (e.g., an access to a URL including the first identifier, as described later), it becomes possible for a user to browse a specific state (e.g., deck information, etc.) in a game corresponding to the first identifier. At this time, the server 2 assigns a second identifier to a session established by this access (designation of the specific state), and associates the second identifier with the first identifier corresponding to the specific state. When the second identifier is input to another user terminal 1, the specific state (deck) corresponding to the first identifier associated with the second identifier is obtained.

Figure 5:
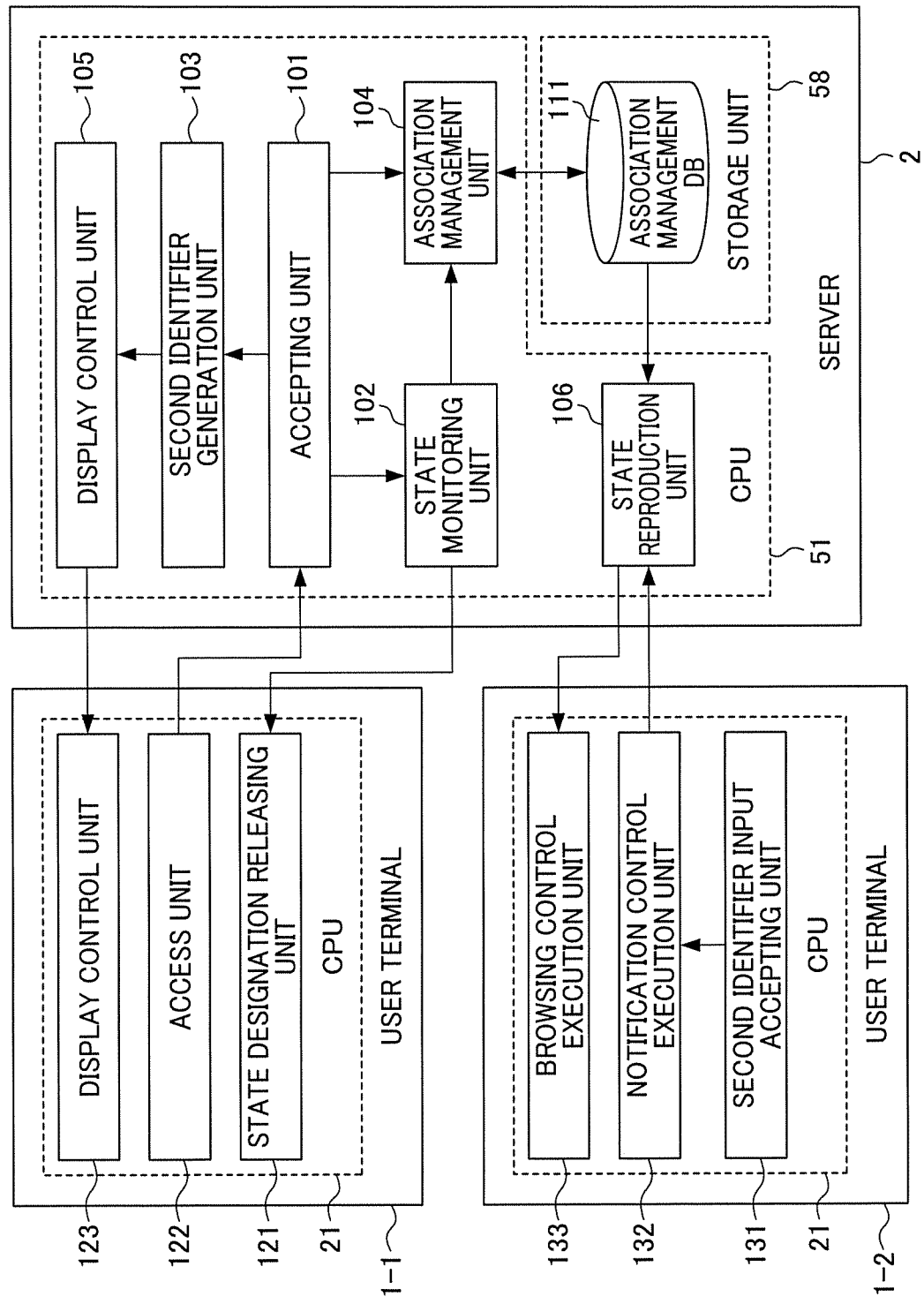
FIG. 5 is a functional block diagram showing an example of the functional configurations for executing game data sharing control in the functional configurations of a user terminal 1-1, a user terminal 1-2, and the server 2.

In order to perform the game data sharing control that has been described above with reference to FIG. 4, the user terminal 1 in FIG. 2 and the server 2 in FIG. 3 have functional configurations as shown in FIG. 5.

FIG. 5 is a functional block diagram showing an example of the functional configurations for executing the game data sharing control in the functional configurations of the user terminal 1-1, the user terminal 1-2, and the server 2.

Note that the user terminal 1-1 and the user terminal 1-2 are selected for convenience, and the functional block of the user terminal 1-1 and the function block of the user terminal 1-2 shown in FIG. 5 both function in any of the user terminals 1.

As shown in FIG. 5, the CPU 51 of the server 2 has the functions of an accepting unit 101, a state monitoring unit 102, a second identifier generation unit 103, an association management unit 104, a display control unit 105, and a state reproduction unit 106.

In addition, the storage unit 58 of the server 2 is provided with an association management DB 111.

The accepting unit 101 accepts, from an access unit 122 of the user terminal 1-1, an access using a first identifier uniquely associated with a specific state.

Here, although the method of the access using the first identifier may be any method using the first identifier and is not particularly limited, this embodiment adopts a method in which a URL including the first identifier is accessed. This method will hereinafter be described with reference to FIG. 6.

Figure 6:
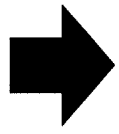
FIG. 6 is an illustration showing an example of a method for identifying a first identifier and a method for generating a URL by using the first identifier.

FIG. 6 is an illustration showing an example of a method for identifying a first identifier and a method for generating a URL by using the first identifier.

The example in FIG. 6 assumes a game in which a group of 40 cards selected from 10,000 kinds of cards is organized as a deck (a specific state in a designated game). In FIG. 6, each card is represented as a box to which a number has been assigned. The number in the box (card) is a serial number of the card and of course is not necessarily printed on an actual card.

By performing 64-bit encoding for representing the serial numbers of the cards in FIG. 6 as combinations of characters among 64 characters, i.e., "0123456789ABCDEFGHI-JKLMNOPQRSTUVWXYZabcdefghijklmnopqrstuvwxyz-_", and separating individual cards by using dot symbols ".", it is possible to designate and represent the entire deck as a string that can be embedded in a URL.

In FIG. 6, the string shown below the boxes is the string obtained by performing 64-bit encoding of the content of the deck. The string obtained by expanding this string into a URL is shown below the arrow in FIG. 6. In this embodiment, this URL can be shared and disseminated through SNSs.

Referring back to FIG. 5, the state monitoring unit 102 monitors whether or not the designation of the specific state is continuing at the user terminal 1-1 that has performed the access using the first identifier.

In this way, the designation of the specific state at the user terminal 1-1 is performed in such a way that the server 2 can monitor the designation. That is, in the case where the access using the first identifier has been performed from the user terminal 1-1, the state monitoring unit 102 starts monitoring the access assuming that the designation of the specific state corresponding to the first identifier has been performed.

Here, as the method for determining whether or not the designation of the specific state is continuing, various methods using network communication technologies can be adopted, and the method is not particularly limited. For example, it is possible to adopt a method in which it is determined that the designation of the specific state is continuing while the network connection from the user terminal 1-1 is continuing. Here, the network connection refers to a broad concept including not only a physical connection for communication, but also a logical connection for communication. Here, the logical connection for communication refers to the state in which, even in the case where the physical connection for communication is temporarily disconnected, a server recognizes that a specific terminal is continuing to access the server by using a technology such as cookie, token, etc. In addition, for example, it is possible to adopt a method in which a ping request is periodically transmitted to the user terminal 1-1 and it is determined that the designation of the specific state is continuing so long as the response thereto does not stop or until a certain time elapses after the response has stopped. In addition, for example, it is possible to adopt a method in which a ping message is periodically transmitted from the user terminal 1-1 to the server 2 and it is determined that the designation of the specific state is continuing while the transmission does not stop or until a certain time elapses after the transmission has stopped.

The second identifier generation unit 103 generates a second identifier when the access using the first identifier by the user terminal 1-1 is accepted by the accepting unit 101.

The association management unit 104 manages the association between the first identifier corresponding to the specific state and the generated second identifier during a period in which the designation of the specific state is continuing or during a prescribed period after the end of said period at the user terminal 1-1, and after that, when it is determined that the designation of the specific state has ended or the prescribed period has elapsed after the end at the user terminal 1-1, the association management unit 104 discards the association between the first identifier and the second identifier.

Specifically, the association management unit 104 manages the association between the first identifier and the second identifier by associating the second identifier generated by the second identifier generation unit 103 with the first identifier used for the access accepted when the second identifier was generated, and registering the first identifier and the second identifier in the association management DB 111.

Then, when it is determined that the designation of the specific state has ended or the prescribed period has elapsed after the end at the user terminal 1-1, the association management unit 104 discards the association between the first identifier and the second identifier by deleting the registration of the first identifier and the second identifier from the association management DB 111. That is, the second identifier is disabled.

The display control unit 105 executes control for displaying, on the user terminal 1-1 that has performed the access using the first identifier, the second identifier generated by the second identifier generation unit 103.

FIG. 7 is an illustration showing an example implementation of the display of a first identifier and a second identifier displayed at a user terminal 1-1.

As shown in an upper part of FIG. 7, when a deck is generated by a user operating the user terminal 1-1, the configuration of the deck is displayed, and a first identifier is displayed therebelow.

When an access using the first identifier (an access to a URL including the first identifier) is performed, and as a result thereof, as described above, for example, a second identifier "tr0n" is generated and associated with the first identifier at the server 2, the second identifier "tr0n" is displayed, under the control of the display control unit 105 of the server 2, in a box on the right of "Code:" displayed in a lower part of FIG. 7.

This second identifier is valid while the deck in FIG. 7 is designated by the user operating the user terminal 1-1, i.e., in this example, while the screen in FIG. 7 is displayed at the user terminal 1-1 and browsed by the user.

Specifically, the remaining valid time of the second identifier is shown by the circle in the lower part of FIG. 7 in the form of an animation. While the screen in FIG. 7 is left open at the user terminal 1-1, the remaining valid time of the second identifier is automatically updated. It should be noted that the determination of whether or not the screen is left open is made in accordance with the determination of whether or not the designation of the specific state is continuing, as described above.

For example, the user operating the user terminal 1-1 can input the second identifier "tr0n" by using the user terminal 1-2, which is a different device, in a prescribed application program or on a website for building a deck.

Alternatively, for example, another user to whom the user operating the user terminal 1-1 has communicated the second identifier in a verbal manner, etc. can input the second identifier "tr0n" by using the user terminal 1-2 that the other user is operating, in a prescribed application program or on a website for building a deck.

Referring back to FIG. 5, when the second identifier is input by the user terminal 1-2 as described above, the state reproduction unit 106 of the server is notified of the second identifier.

Then, the state reproduction unit 106 executes control for making it possible to reproduce, at the user terminal 1-2, the specific state corresponding to the first identifier associated with the second identifier.

Specifically, for example, in the context of the example in FIG. 7, the state reproduction unit 106 reproduces the information of the deck identified by the first identifier associated with the second identifier (the information related to the same deck as the deck displayed in the screen information in FIG. 7), and displays the information at the user terminal 1-2.

As described above, as a key representing a specific state (deck configuration) in a game and shared between users and between devices, it is possible to use a short second identifier that is about four characters long, such as "tr0n". As a result, it becomes possible to realize communication of complex information, such as a deck configuration, very easily.

The outline of the functional configurations of the user terminal 1-1 and the user terminal 1-2 will also be described below.

First, as shown in FIG. 5, the CPU 21 of the user terminal 1-1 has the functions of a state designation releasing unit 121, the access unit 122, and a display control unit 123.

The state designation releasing unit 121 performs the designation or release of a specific state.

Specifically, in the case where a user designates a specific state through the touchscreen of the user terminal 1-1 (e.g., in the case where the user generates or selects a deck), the state designation releasing unit 121 accepts the designation, and displays the designated specific state on the touchscreen via the display control unit 123, which will be described later, and stores the specific state in the storage unit 29 of the user terminal 1-1 or the storage unit 58 of the server 2. In addition, the user can read the state designated in the past (e.g., the generated deck) from, for example, the storage unit 29 or the storage unit 58, and newly designate the state. In this case, the state designation releasing unit 121 accepts the designation, and displays the designated specific state on the touchscreen via the display control unit 123, which will be described later.

When the specific state is designated, the access unit 122, which will be described later, performs an access using a first identifier corresponding to the specific state. Then, the server 2 recognizes that the designation of the specific state has been started.

After that, the state designation releasing unit 121 releases the designation of the specific state in such a way that it is possible for the server 2 side to recognize the release.

It suffices for the method for releasing (terminating) the designation of the specific state to be a method with which the release (termination) can be recognized at the server 2 side, i.e., a method corresponding to a method for determining the termination of the designation of the specific state, which is adopted at the server 2 side.

For example, in the case where, in a method adopted at the server 2 side, it is determined that the designation of the specific state has been terminated when a network connection has been disconnected, the state designation releasing unit 121 releases the designation of the specific state by disconnecting the network connection with the server 2.

In addition, for example, in the case where, in a method adopted at the server 2 side, a ping request is periodically transmitted to the user terminal 1-1 and it is determined that the designation of the specific state has been terminated when a certain time elapses after the response has stopped, the state designation releasing unit 121 performs processing in which the response to the ping request is generated when continuing the designation of the specific state, and the generation of the response is prohibited when releasing the specific state.

The access unit 122 performs, when a specific state is designated, control for performing an access using a first identifier corresponding to the specific state.

When the specific state is designated as described above, the display control unit 123 displays the specific state (and first identifier, as needed) on the touchscreen, and in the case where a second identifier corresponding to the first identifier is generated by the server 2 and is notified, executes control for displaying the second identifier on the touchscreen. That is, display control unit 123 executes control for displaying, for example, a screen as shown in FIG. 7 on the touchscreen.

The outline of the functional configuration of the user terminal 1-1 has been described above. Next, the outline of the functional configuration of the user terminal 1-2 will be described.

The CPU 21 of the user terminal 1-2 has the functions of a second identifier input accepting unit 131, a notification control execution unit 132, and a browsing control execution unit 133.

The second identifier input accepting unit 131 accepts an input of a second identifier displayed on the display unit 27 of the user terminal 1-1 and input by a user operating the user terminal 1-2 (this user may be the user of the user terminal 1-1 or a different user) through the touchscreen, etc.

Here, assuming that the user of the user terminal 1-1 is User-A, and the user of the user terminal 1-2 is User-B, which is a different user, the association between the second identifier displayed on the user terminal 1-1 and the second identifier input to the user terminal 1-2 will be described with reference to FIG. 8.

Figure 8:
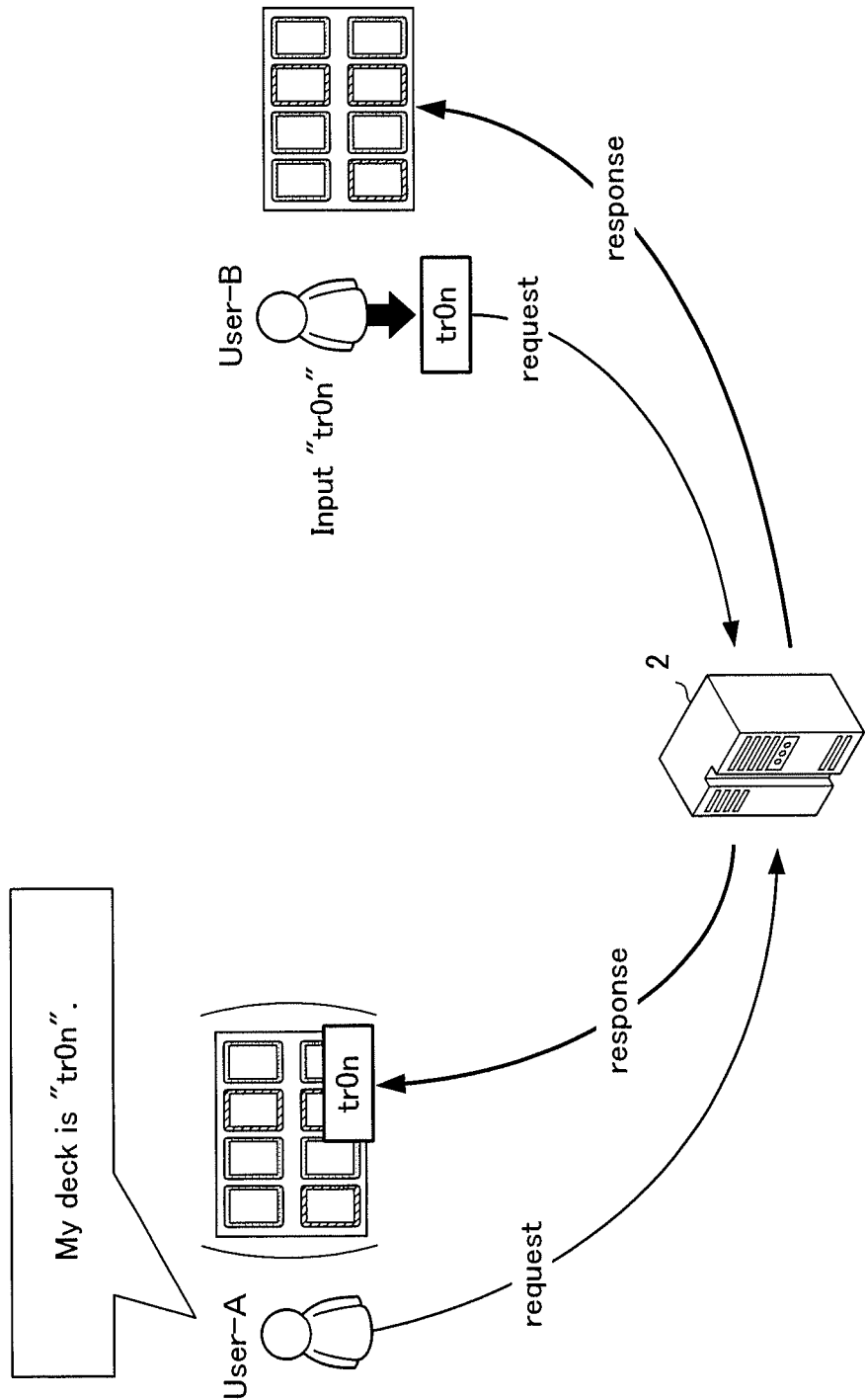
FIG. 8 is an illustration showing the process in which User-A notifies the second identifier verbally and User-B shares information related to the deck of User-A.

FIG. 8 is an illustration showing the process in which User-A notifies the second identifier verbally and User-B shares information related to the deck of User-A.

As shown in FIG. 8, User-A notifies User-B of the second identifier "tr0n" verbally in order to cause the deck of User-A to be reproduced at the User-B side.

Here, when the deck is displayed (a specific state is designated) on the user terminal 1-1 possessed by User-A, the second identifier "tr0n" is generated by the server 2 and is displayed on the user terminal 1-1, as a result of performing an access using a first identifier corresponding to the deck (see FIG. 7).

The second identifier "tr0n" is kept valid and under control as long as the deck information is displayed on the screen of the user terminal 1-1 (i.e., as long as the designation of the specific state continues).

User-B, to whom the second identifier "tr0n" has been communicated verbally, inputs the second identifier "tr0n" by using the touchscreen of the user terminal 1-2, etc.

Referring back to FIG. 5, the second identifier input accepting unit 131 of the user terminal 1-2 accepts the input second identifier "tr0n".

The notification control execution unit 132 executes control for notifying the server 2 of the second identifier input by the second identifier input accepting unit 131, e.g., "tr0n" in the example in FIG. 8.

Then, as described above, the state reproduction unit 106 of the server 2 executes control for making it possible to reproduce, at the user terminal 1-2, the specific state (information related to the deck shown in the figure in the example in FIG. 8) corresponding to the first identifier associated with the second identifier ("tr0n" in the example in FIG. 8).

The browsing control execution unit 133 executes, under the control by the state reproduction unit 106 of the server 2, control for making a user (User-B in the example in FIG. 8) browse the specific state (information related to the deck shown in the figure in the example in FIG. 8) corresponding to the first identifier associated with the second identifier ("tr0n" in the example in FIG. 8).

In this way, it becomes possible to share the deck information by merely notifying the second identifier, which is a verbally communicable short string (in this case, "tr0n") without performing pairing processing (e.g., becoming friends in the game) between User-A and User-B or pairing processing between the user terminals 1 of User-A and User-B.

That is, in this embodiment, a shortened code is not assigned to the deck information, but a universal and permanent first identifier is assigned to the deck information. In addition, the second identifier, such as a short string, is generated on the condition that an access using the permanent first identifier is performed, and the first identifier and the second identifier are associated with each other. Accordingly, from the viewpoint of the user, it becomes possible to communicate the deck information as a result of communicating the second identifier, such as a short string, simply with a verbal utterance.

Mathematically, for example, when combining 40 cards among 4,000 cards, there are $4,000^{40}$ ($=1.2 \times 10^{144}$) variations, and these variations cannot be represented only with a four character code.

However, there is an upper limit for the number of users simultaneously performing network connections to these variations, which is about several hundred thousand. Thus, by representing, as a second identifier, a four-character alphanumeric string that can represent 1,679,616 combinations, it becomes possible to communicate information related to a deck constituted of 40 cards arbitrarily selected from among 4,000 cards.

The functional configurations of the user terminal 1-1, the user terminal 1-2, and the server 2 for realizing game data sharing control have been described above.

Next, the flow of game data sharing from the viewpoint of users of the user terminal 1-1 and the user terminal 1-2 will be described with reference to FIG. 9.

Figure 9:
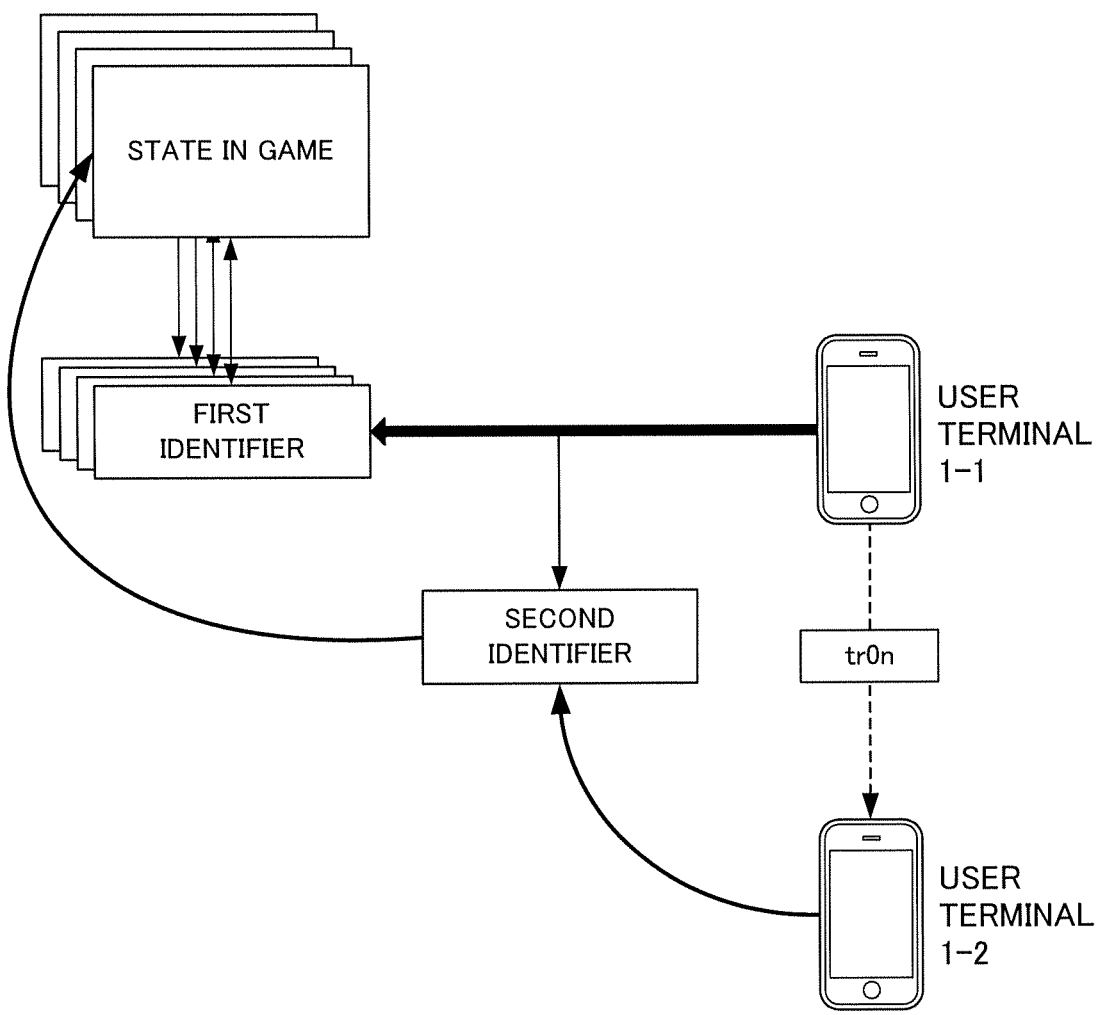
FIG. 9 is an illustration showing the steps of a user's access to deck information.

FIG. 9 is an illustration showing the steps of a user's access to deck information.

Note that the user terminal 1-1 and the user terminal 1-2 may be different terminals (e.g., a smartphone and a personal computer) possessed by the same user, or different terminals possessed by different users.

As a first step, a user operates the user terminal 1-1 to obtain a first identifier from an SNS, or from saved game data in the case where the first identifier is associated with the deck of the user. Then, the user browses the deck (specific state in the game) uniquely associated with the first identifier through a web browser or game app displayed on the touchscreen of the user terminal 1-1, etc.

As a second step, when the deck (specific state) in the game is browsed through the web browser or the game app, a second identifier (in this case, "tr0n") that is only valid while the browsing action continues (for example, while the network connection is open) is displayed on the touchscreen of the user terminal 1-1, etc., whereby the user visually identifies the displayed second identifier (in this case, "tr0n").

As a third step, the user inputs the second identifier (in this case, "tr0n") displayed on the user terminal 1-1 by using the touchscreen of the user terminal 1-2, etc. Here, when a different user performs this step, the user who visually identified the second identifier (in this case, "tr0n") (first user) needs to communicate the second identifier to the user who performs the third step (second user) in a verbal manner or the like in advance.

As a fourth step, in response to the third step, the server 2 reproduces, on the user terminal 1-2, the specific state in the game associated with the first identifier corresponding to the second identifier (in this case, "tr0n") input in the third step. In this way, it becomes possible for the user to access the deck information corresponding to the first identifier obtained in the first step.

Note that the association between the second identifier (in this case, "tr0n") and the first identifier is discarded when the user terminal 1-1 terminates the browsing of the deck (releases the designation of the specific state in the game).

Next, the use of this embodiment on an SNS will be described.

FIG. 10 is an illustration showing an example of sharing deck information on an SNS.

As shown on the left side of FIG. 10, a URL including a first identifier and information related to a deck (specific state in a game) are displayed in an OGP (Open Graph Protocol) on a first SNS. Users of the first SNS can access the deck (specific state in the game) associated with the first identifier by clicking the URL in the OGP.

In addition, as shown on the right side of FIG. 10, a rectangular button and a deck are displayed using an OGP on a second SNS. This rectangular button is associated with the URL including the first identifier, and users of the second SNS can access the deck (specific state in the game) associated with the first identifier by clicking the rectangular button in the OGP display.

This processing is possible because the first identifier is not only an internal identifier of the system according to this embodiment, but also an identifier that can be embedded in a URL and that is suitable for widely distributing the deck information through an SNS.

This makes it possible to disseminate the deck information by thumbnailing a web page written in accordance with the OGP format of the SNS, as shown in FIG. 10.

Next, the flow of game data sharing processing executed by the user terminal 1-1, the user terminal 1-2, and the server 2 having functional configurations as in FIG. 5 will be described with reference to FIG. 11.

FIG. 11 is an arrow chart showing the flow of game data sharing processing executed by the user terminal 1-1, the user terminal 1-2, and the server 2.

In step S1, the state designation releasing unit 121 of the user terminal 1-1 performs the designation of a specific state.

In step S2, the access unit 122 of the user terminal 1-1 performs an access using a first identifier corresponding to the specific state.

In step S20, the accepting unit 101 of the server 2 accepts the access using the first identifier from the user terminal 1-1.

In step S21, the state monitoring unit 102 of the server 2 recognizes the first identifier on the basis of the access accepted in step S20.

In step S22, the second identifier generation unit 103 of the server 2 generates a second identifier.

In step S23, the association management unit 104 of the server 2 performs an association between the first identifier recognized in step S21 and the second identifier generated in step S22.

In step S24, the display control unit 105 of the server 2 notifies the user terminal 1-1 of the second identifier generated in step S22.

In step S3, the display control unit 123 of the user terminal 1-1 causes the second identifier notified from the server 2 in step S24 to be displayed on a touchscreen.

Here, the second identifier displayed on the touchscreen of the user terminal 1-1 is communicated to a user operating the user terminal 1-2.

Here, when users of the user terminal 1-1 and the user terminal 1-2 are the same, "communicated" means that the user memorizes the identifier in their brain, etc. When the users of the user terminal 1-1 and the user terminal 1-2 are different, "communicated" means that the identifier is communicated in a verbal manner, etc.

In step S31, the second identifier input accepting unit 131 of the user terminal 1-2 accepts the input of the second identifier.

In step S32, the notification control execution unit 132 of the user terminal 1-2 notifies the server 2 of the second identifier accepted in step S31.

In step S25, the state reproduction unit 106 of the server 2 recognizes the second identifier notified in step S32.

In step S26, the state reproduction unit 106 recognizes the first identifier corresponding to the second identifier recognized in step S25.

In step S27, the state reproduction unit 106 executes control for reproducing, on the user terminal 1-2, the specific state corresponding to the first identifier recognized in step S26.

That is, in step S33, the browsing control execution unit 133 of the user terminal 1-2 executes control for causing the user of the user terminal 1-2 to browse the specific state in response to the control in step S27.

Note that, in the case where the state designation releasing unit 121 of the user terminal 1-1 performs releasing of the specific state in step S4, the association management unit 104 of the server 2 discards the association between the first identifier and the second identifier in step S28.

Next, an example implementation for the case where a plurality of items of deck information (i.e., a plurality of specific states) are displayed in a single web page in the SNS in this embodiment, etc. will be described.

For example, in the case of an online forum, a web BBS, or an SNS, etc. displayed in a web page, it is possible to list a plurality of items of deck information in such a way that the items are included in a web page identified by a single URL.

In the case where the plurality of items of deck information are included in a single web page, it is difficult to identify, from among the plurality of items of deck information, the designated (displayed) item of deck information from only the URL of the web page. Thus, for example, there is proposed a method in which, by using a JavaScript (registered trademark) code associated with information related to the display of each of the plurality of items of deck information, an item of deck information designated (displayed) by a user is identified from among the plurality of items of deck information, a code generated on the basis of the identified item of deck information is transmitted to the server as a first identifier and is associated with a second identifier, and the identified item of deck information and the second identifier are displayed in association with each other.

Figure 12A:
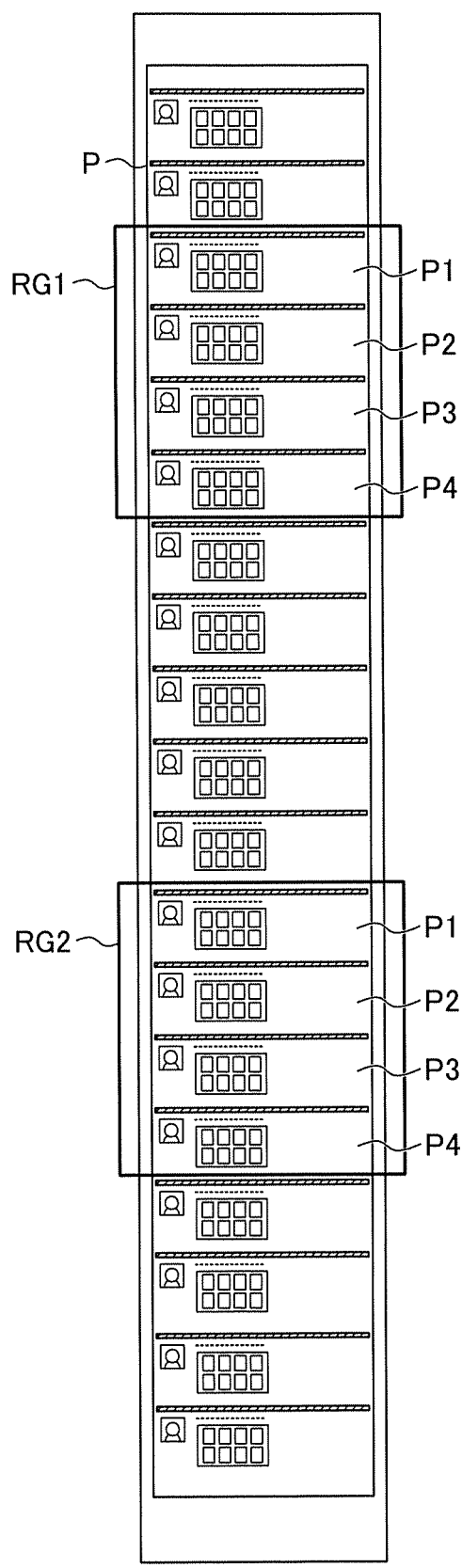
FIGS. 12A and 12B are an illustration showing an example implementation for the case where a plurality of items of deck information P are displayed in a forum, a BBS, and an SNS in this embodiment.
Figure 12B:
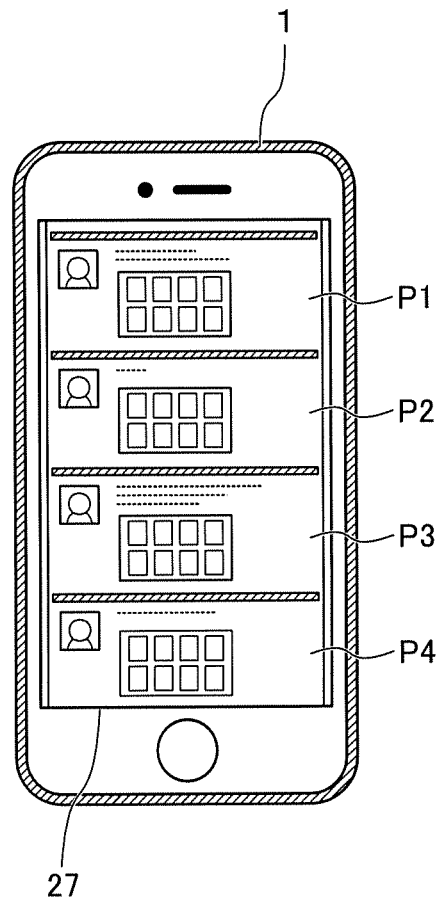

FIGS. 12A and 12B are an illustration showing an example implementation for the case where a plurality of items of deck information P are displayed in the forum, the BBS, and the SNS in this embodiment.

FIG. 12A is an illustration showing an example of the plurality of items of deck information P that are to be displayed in the forum, the BBS, and the SNS.

FIG. 12B is an illustration showing some of the items of deck information P displayed on the display unit 27 of the user terminal 1.

The items of deck information P in FIGS. 12A and 12B each include a prescribed deck (specific state in a game) and a first identifier (URL including the first identifier) corresponding to the deck. In this embodiment, in individual display areas P1 to P4 of the display unit 27 of the user terminal 1, four items of deck information P selected from among a plurality of items of deck information P in FIG. 12A are displayed.

That is, as shown in FIG. 12A, the plurality of items of deck information P are arranged in the vertical direction, and among these items, four items of deck information P are selected and displayed in the individual display areas P1 to P4 of the display unit 27 of the user terminal 1.

For example, in the case where a range RG1 in FIG. 12A is selected, four items of deck information P included in the range RG1 are displayed in the individual display areas P1 to P4 of the display unit 27 of the user terminal 1.

Here, in the case where a user wishes to select a range RG2 in FIG. 12A, the user may perform a scroll operation on the display unit 27 (touchscreen) of the user terminal 1.

When a scroll occurs and the range RG1 in FIG. 12A is selected, four items of deck information P included in the range RG2 are displayed in the individual display areas P1 to P4 of the display unit 27 of the user terminal 1.

That is, due to the scroll operation, items of deck information P displayed in the individual display areas P1 to P4 of the display unit 27 of the user terminal 1 change.

The example implementation will be described below.

As shown in FIG. 12A, in the online forum, BBS, and SNS in which deck information P can be shared, items of deck information P from individual users are arranged vertically in a single page. In this kind of forum, since a huge number of items of deck information P are listed in a page identified by a single URL, an existing method such as a shortened URL cannot be used.

In this embodiment, the valid period of a second identifier is managed in accordance with whether users are browsing the information (designating a specific state in a game), and thus, this embodiment can be applied, for example, even in the case where a plurality of items of deck information P are listed in a single web page identified by a single URL.

Specifically, by using a function of a web browser installed on the user terminal 1-1 shown in FIG. 5, it is possible to extract HTML elements within a range currently displayed on the user terminal 1-1 side (in the example in FIGS. 12A and 12B, the display range RG1 or RG2).

At this time, the user terminal 1-1 accesses the server 2, and transmits, to the accepting unit 101, deck information P included in HTML elements displayed by the display control unit 123. Here, deck information P is information corresponding to a first identifier, and in this embodiment, is information obtained by converting the first identifier into a format that can be applied to HTML elements (a format that can be embedded in HTML). Although the deck information P serving as the first identifier is information identified by a first identifier identification unit, which is not shown, in this embodiment, a plurality of first identifiers (items of deck information P) are included in HTML elements in a web page.

When the server 2 accepts the access, the second identifier generation unit 103 generates a second identifier, and the association management unit 104 associates the first identifier with the second identifier.

Then, the user terminal 1-1 obtains the second identifier of the deck information P from the server 2, and displays the second identifier on the screen.

In addition, the web browser has a function for obtaining an amount of scroll performed by a user on the screen as scrollTop, which is an amount of scroll in the vertical direction (the distance between the upper left corner of a window and the upper end of a page), and scrollLeft, which is a scroll amount in the right direction (the distance between the upper left corner of a window and the left end of a page).

By using this function, it is possible for the state monitoring unit 102 shown in FIG. 5 to check for changes in this value regularly, thereby detecting which range in FIG. 12A is displayed (e.g., whether it is the range RG1 or the range RG2). When the state monitoring unit 102 detects that the display range has been changed, the state monitoring unit 102 can determine whether deck information P in the display range is displayed on the screen, transmit the deck information P (or a first identifier generated from the deck information P) included in the display range to the server 2, obtain a second identifier corresponding to the deck information P from the server 2, and display the second identifier in association with the deck information P.

Here, the web browser functions as, for example, a display information extraction unit, which is not shown, defined by JavaScript (registered trademark). As described above, although the display information extraction unit is a means for extracting, from HTML elements representing content displayed on the user terminal 1-1, deck information P within a prescribed display range, the size (or width) of the display range (i.e., extraction range) in this case is not particularly limited and can be designed, as appropriate. Although the size of the display range is preferably designed as a size corresponding to the display screen of the user terminal 1-1, such as the range RG1 in FIGS. 12A and 12B, there is no limitation to this size in the implementation of the present invention. In addition, for example, considering a whole web page identified by a certain URL as a display range, the display information extraction unit may extract deck information P while setting all HTML elements included in the web page as an extraction range.

That is, for example, in the case where a plurality of items of deck information P included in a display range in FIG. 12A are extracted by the display information extraction unit, the server 2 obtains a plurality of first identifiers corresponding to the individual items of deck information P, and associates the obtained individual first identifiers with second identifiers. Then, the second identifiers associated with the individual items of deck information P are displayed on the display unit 27 of the user terminal 1-1.

In addition, for example, even in the case where a plurality of items of deck information P are extracted from the display range by the display information extraction unit, the server 2 can display, on the display unit 27 of the user terminal 1-1, only a second identifier corresponding to an item of deck information P located at a position closest to the center of the selected range.

In other words, since deck information P is extracted from HTML elements within the selected range by the display information extraction unit after detecting the change in the display range, it is considered that a specific state in a game corresponding to the deck information P is designated, and an access using the first identifier corresponding to the specific state is performed.

Note that the reproduction of a specific state in a game on the user terminal 1-2 is similar to that in the above description, and thus will not be described.

In addition, the server 2 may disable second identifiers corresponding to items of deck information P located outside of the display range.

That is, when it is detected that the display range has been changed, the state monitoring unit 102 shown in FIG. 5 cooperates with the association management unit 104 and the association management DB 111 so as to release the association between first identifiers corresponding to the deck information P located outside of the display range and second identifiers associated with the first identifiers, and discard information from the association management DB 111 to finish the management. However, the discarding of the association may be performed when becoming outside of the display range, or when a prescribed period elapses after becoming outside of the display range.

Although an embodiment of the present invention has been described above, it is to be noted that the present invention is not limited to the above-described embodiment and that modifications, improvements, etc. within a scope in which it is possible to achieve the object of the present invention are encompassed in the present invention.

For example, the above-described embodiment is directed to data sharing in a card game.

However, the present invention is not particularly limited to this embodiment, and is applicable to general data sharing between devices. That is, without limitation to games, the present invention is widely applicable to data sharing between users or between devices.

In addition, for example, in the above-described embodiment, a first identifier included in a URL is used as an example for convenience of explanation, but there is no particular limitation to this example.

That is, as described above, it suffices for first identifiers to be permanently unique identifiers that make it possible to identify a huge number of specific states of data. Thus, for example, first identifiers are applicable to various identifiers such as one-dimensional codes or two-dimensional codes.

In addition, for example, in the above-described embodiment, a second identifier constituted of four characters including numbers or uppercase or lowercase alphabets is used as an example for convenience of explanation, but there is no particular limitation to this example.

That is, as described above, it suffices for the second identifier to be an identifier having temporary uniqueness that makes it possible to identify, when a user browses data, the browsing action of the user from among simultaneous access sessions. Thus, for example, the second identifier does not need to be four characters long and may be a permanent short identifier that can be distributed in a printed form, etc. by combining a symbol with the identifier. Specifically, the second identifier may be an identifier that is not disabled when it starts with a plus sign, such as "+5t7".

In addition, for example, in the above-described embodiment, processing in a game is used for explanation for convenience thereof, but there is no particular limitation to this example, and it suffices for the processing to be processing that handles a reproducible specific state arbitrarily designated by a user.

In addition, for example, the functional configuration in FIG. 5 is only an example, and there is no particular limitation to this example. That is, it suffices that an information processing device be provided with functions that enable the execution of the above-described series of processing steps as a whole, and the choice of functional blocks for implementing the functions is not particularly limited to the example in FIG. 5. Furthermore, the locations of the functional blocks are not particularly limited to those in FIG. 5 and may be arbitrarily set. For example, the functional blocks of the server 2 may be transferred to the user terminal 1, etc., and conversely, the functional blocks of the user terminal 1 may be transferred to the server 2, etc.

Furthermore, each functional block may be implemented by hardware alone, by software alone, or by a combination of hardware and software.

In the case where the processing by each functional block is executed by software, a program constituting the software is installed on a computer, etc. via a network or from a recording medium.

The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a user, a recording medium that is provided to a user as embedded in the main unit of the apparatus, etc.

In this specification, steps dictated in the program recorded on the recording medium may include not only processing that is executed sequentially in order of time but also processing that is not executed sequentially in order of time but is executed in parallel or individually.

Furthermore, in this specification, the term "system" should be construed to mean an overall apparatus constituted of a plurality of devices, a plurality of means, etc.

In other words, an information processing program to which the present invention is applied may be embodied in various forms configured as follows, including the information processing system according to the above-described embodiment in FIG. 5.

Specifically, the information processing program to which the present invention is applied is a program that causes a server to execute control processing, the server communicating with a plurality of terminals on which it is possible to display a reproducible specific state arbitrarily designated by a user on the basis of the designation, the control processing including:

an accepting step (e.g., the step performed by the accepting unit 101 in FIG. 5) of accepting an access using a first identifier uniquely associated with the specific state from a first terminal among the plurality of terminals;

a monitoring step (e.g., the step performed by the state monitoring unit 102 in FIG. 5) of monitoring whether or not the designation of the specific state is continuing at the first terminal that has performed the access using the first identifier;

a generation step (e.g., the step performed by the second identifier generation unit 103 in FIG. 5) of generating a second identifier when the access performed by the first terminal using the first identifier is accepted;

a display control step (e.g., the step performed by the display control unit 105 in FIG. 5) of executing control for displaying the generated second identifier on the first terminal;

a management step (e.g., the step performed by the association management unit 104 in FIG. 5) of managing the association between the first identifier corresponding to the specific state and the generated second identifier during a period in which the designation of the specific state is continuing or during a prescribed period after the end of said period at the first terminal, and after that, when it is determined that the designation of the specific state has ended or the prescribed period has elapsed after the end at the first terminal, discarding the association between the first identifier and the second identifier; and a state reproduction step (e.g., the step performed by the state reproduction unit 106 in FIG. 5) of executing, in the case where the second identifier is notified from a second terminal among the plurality of terminals while the management is continuing in the management step, control for making it possible to reproduce the specific state corresponding to the first identifier associated with the second identifier at the second terminal.

In this way, the technology for immediately sharing data indicating a specific state between users and between devices is established.

That is, by separately providing a first identifier used when data is distributed through various media, and a second identifier used when the data is loaded into an application, and adopting this two-step identifier management method in which the association between these two identifiers is dynamically managed, data distribution and input in which information representation ability and ease of input are provided is realized.

Here, the number of users browsing data is much smaller than the number of specific states in the data.

Thus, by dynamically associating the first identifier that identifies a specific state in the data with the second identifier that identifies an action of browsing the specific state, it is possible to realize scalability such that the number of identifiers is sufficient even when a user has performed registration processing thousands of times for communication between devices.

This makes it possible, in the present invention, to realize temporary sharing processing between devices, in which, without performing processing such as login, etc., data registered on one device is edited on another device, and the data is immediately reflected on the one device.

In addition, the accepting step can include a step of accepting, as an access using the first identifier, an access using a URL that includes the first identifier as an element thereof.

This makes it possible to directly use existing mechanisms for distributing URLs via paper media such as magazines or network services such as SNSs.

In addition, the generation step can include a step of generating, as the second identifier, an identifier having a smaller amount of information than that provided in the first identifier.

This makes the generated second identifier shorter and simpler, and thus, it becomes possible to verbally communicate the second identifier between users, to share the data with an unspecified number of users, or to immediately share the data with an unknown user on the spot.

In addition, even in the case where the number of specific states in the data becomes huge, the number of identifiers input by users does not increase, and even in the case where the number of times of data registration processing for transferring the data to another user or device becomes huge, the number of identifiers input by the users does not increase.

EXPLANATION OF REFERENCE NUMERALS

1 User terminal
2 Server
21 CPU
51 CPU
58 Storage unit
101 Accepting unit
102 State monitoring unit
103 Second identifier generation unit
104 Association management unit
105 Display control unit
106 State reproduction unit
111 Association management DB
121 State designation releasing unit
122 Access unit
123 Display control unit
131 Second identifier input accepting unit
132 Notification control execution unit
133 Browsing control execution unit

The invention claimed is:

1. A non-transitory computer readable medium storing a program, the program comprising functionality for:

an accepting step of accepting an access using a first identifier uniquely associated with a specific state from a first terminal among a plurality of terminals, wherein the program causes a server to execute control processing and communicate with the plurality of terminals, and wherein the plurality of terminals display the specific state arbitrarily designated by a user based on a designation;

a monitoring step of monitoring whether or not the designation of the specific state is continuing at the first terminal that has performed the access using the first identifier;

a generation step of generating a second identifier when the access performed by the first terminal using the first identifier is accepted;
a display control step of executing control for displaying the second identifier on the first terminal;
a management step of managing an association between the first identifier corresponding to the specific state and the second identifier during a period in which the designation of the specific state is continuing or during a prescribed period after an end of said period at the first terminal, and after that, when it is determined that the designation of the specific state has ended or the prescribed period has elapsed after the end at the first terminal, discarding the association between the first identifier and the second identifier; and
a state reproduction step of executing, when the second identifier is notified from a second terminal among the plurality of terminals while management is continuing in the management step, control that reproduces the specific state corresponding to the first identifier associated with the second identifier at the second terminal.

2. The non-transitory computer readable medium storing a program according to claim 1, wherein the accepting step comprises a step of accepting, as an access using the first identifier, an access using a URL that includes the first identifier as an element thereof.

3. The non-transitory computer readable medium storing a program according to claim 1, wherein the generation step comprises a step of generating, as the second identifier, an identifier having a smaller amount of information than that provided in the first identifier.

4. An information processing device comprising:
an accepting means for accepting an access using a first identifier uniquely associated with a specific state from a first terminal among a plurality of terminals, wherein the information processing device causes a server to execute control processing and communicate with the plurality of terminals, and wherein the plurality of terminals display the specific state arbitrarily designated by a user based on a designation;
a monitoring means for monitoring whether or not the designation of the specific state is continuing at the first terminal that has performed the access using the first identifier;
a generation means for generating a second identifier when the access performed by the first terminal using the first identifier is accepted;
a display control means for executing control for displaying the second identifier on the first terminal;
a management means for managing an association between the first identifier corresponding to the specific state and the second identifier during a period in which the designation of the specific state is continuing or during a prescribed period after an end of said period at the first terminal, and after that, when it is determined that the designation of the specific state has ended or the prescribed period has elapsed after the end at the first terminal, discarding the association between the first identifier and the second identifier; and
a state reproduction means for executing, where when the second identifier is notified from a second terminal among the plurality of terminals while the management is continuing in the management means, control that reproduces the specific state corresponding to the first identifier associated with the second identifier at the second terminal.

5. An information processing method comprising:
an accepting step of accepting an access using a first identifier uniquely associated with a specific state from a first terminal among a plurality of terminals wherein the information processing method is performed by a server communicating with the plurality of terminals, and wherein the plurality of terminals display the specific state arbitrarily designated by a user based on a designation;
a monitoring step of monitoring whether or not the designation of the specific state is continuing at the first terminal that has performed the access using the first identifier;
a generation step of generating a second identifier when the access performed by the first terminal using the first identifier is accepted;
a display control step of executing control for displaying the second identifier on the first terminal;
a management step of managing an association between the first identifier corresponding to the specific state and the second identifier during a period in which the designation of the specific state is continuing or during a prescribed period after an end of said period at the first terminal, and after that, when it is determined that the designation of the specific state has ended or the prescribed period has elapsed after the end at the first terminal, discarding the association between the first identifier and the second identifier; and
a state reproduction step of executing, when the second identifier is notified from a second terminal among the plurality of terminals while the management is continuing in the management step, control that reproduces the specific state corresponding to the first identifier associated with the second identifier at the second terminal.

6. An information processing system comprising:
a server and a plurality of terminals that display a specific state arbitrarily designated by a user based on a designation,
wherein the server includes:
an accepting means for accepting an access using a first identifier uniquely associated with the specific state from a first terminal among the plurality of terminals,
a monitoring means for monitoring whether or not the designation of the specific state is continuing at the first terminal that has performed the access using the first identifier,
a generation means for generating a second identifier when the access performed by the first terminal using the first identifier is accepted,
a display control means for executing control for displaying the second identifier on the first terminal,
a management means for managing an association between the first identifier corresponding to the specific state and the second identifier during a period in which the designation of the specific state is continuing or during a prescribed period after an end of said period at the first terminal, and after that, when it is determined that the designation of the specific state has ended or the prescribed period has elapsed after the end at the first terminal, discarding the association between the first identifier and the second identifier, and
a state reproduction means for executing, when the second identifier is notified from a second terminal among the plurality of terminals while the management is continuing in the management means, control that reproduces the specific state corresponding to the first identifier associated with the second identifier at the second terminal;

wherein the first terminal among the plurality of terminals includes:
  an access means for performing an access using the first identifier uniquely associated with the specific state, and
  a display means for displaying the second identifier in response to the control by the display control means of the server, when the second identifier that is only valid during a period in which the designation of the specific state is continuing or during a prescribed period after the end of said period is generated at the server in association with the first identifier; and wherein the second terminal among the plurality of terminals includes a computer that:
  accepts an input of the second identifier generated by the server and displayed on the first terminal, and executing control for notifying the server of the second identifier, and
  executes, when the second identifier is notified under the control by the computer while the monitoring by the monitoring means is continuing at the server, control for reproducing the specific state such that a user of the second terminal can browse the specific state, in response to the control by the state reproduction means of the server.

* * * * *